United States Patent
Thomas et al.

(10) Patent No.: US 11,316,942 B2
(45) Date of Patent: Apr. 26, 2022

(54) PROVIDING FINANCIAL EVENTS USING A PUSH FRAMEWORK

(71) Applicant: Finicity Corporation, Murray, UT (US)

(72) Inventors: Nicholas A. Thomas, Murray, UT (US); Jessie A. Morris, Murray, UT (US); Charles Matthew Whitmer, Murray, UT (US)

(73) Assignee: Finicity Corporation, Murray, UT (US)

(*) Notice: Subject to any disclaimer, the term of this patent is extended or adjusted under 35 U.S.C. 154(b) by 1512 days.

(21) Appl. No.: 14/834,176

(22) Filed: Aug. 24, 2015

(65) Prior Publication Data

US 2020/0314194 A1 Oct. 1, 2020

Related U.S. Application Data

(60) Provisional application No. 62/040,921, filed on Aug. 22, 2014.

(51) Int. Cl.
*H04L 29/08* (2006.01)
*G06F 21/62* (2013.01)
*G06Q 40/02* (2012.01)
*H04L 67/55* (2022.01)
*H04L 67/53* (2022.01)

(52) U.S. Cl.
CPC .......... *H04L 67/26* (2013.01); *G06F 21/6245* (2013.01); *G06Q 40/02* (2013.01); *H04L 67/20* (2013.01)

(58) Field of Classification Search
CPC ..... H04L 67/26; H04L 67/20; G06F 21/6245; G06Q 40/02
See application file for complete search history.

(56) References Cited

U.S. PATENT DOCUMENTS

| | | | |
|---|---|---|---|
| 2004/0068481 A1* | 4/2004 | Seshadri | G06Q 30/02 |
| 2005/0021843 A1* | 1/2005 | Duigenan | H04L 12/185 |
| | | | 709/238 |
| 2010/0138316 A1* | 6/2010 | Connors | G06Q 30/0601 |
| | | | 705/26.1 |
| 2011/0040863 A1* | 2/2011 | Griffin | H04L 67/1095 |
| | | | 709/223 |
| 2011/0270763 A1* | 11/2011 | Graham, III | G06Q 20/3829 |
| | | | 705/71 |

(Continued)

OTHER PUBLICATIONS

Title: "HMAC: Keyed-Hashing for Message Authentication" Author: Krawczyk et al. An online NPL publication with publication date Feb. 1997; URL: https://tools.ietf.org/html/rfc2104 (Year: 1997).*

*Primary Examiner* — Uzma Alam
*Assistant Examiner* — Kamal Hossain
(74) *Attorney, Agent, or Firm* — Hovey Williams LLP (57) ABSTRACT

Financial events can be provided using a push framework. Using the push framework, an aggregation provider can subscribe to receive a customer's financial data without ever requiring access to the customer's login credentials. Once an aggregation provider has subscribed to receive a customer's financial data, the financial institution's system can push financial events to the subscribed aggregation provider describing changes that have occurred to the customer's financial data.

17 Claims, 9 Drawing Sheets

(56) References Cited

U.S. PATENT DOCUMENTS

| | | | |
|---|---|---|---|
| 2011/0282711 A1* | 11/2011 | Freishtat | G06Q 20/102 |
| | | | 705/7.29 |
| 2012/0079066 A1* | 3/2012 | Li | H04L 67/26 |
| | | | 709/217 |
| 2012/0166552 A1* | 6/2012 | Seligstein | H04L 51/12 |
| | | | 709/206 |
| 2012/0185561 A1* | 7/2012 | Klein | H04L 67/02 |
| | | | 709/217 |
| 2014/0236792 A1* | 8/2014 | Pant | G06Q 40/02 |
| | | | 705/35 |
| 2015/0039444 A1* | 2/2015 | Hardin | G06Q 20/102 |
| | | | 705/14.69 |

\* cited by examiner

Receive, From An Aggregation Provider, A Discovery Request That Includes An Access Token, The Access Token Identifying A Customer That Has An Account With The Financial Institution

802

In Response To The Discovery Request, Send, To The Aggregation Provider, A Listing Of One Or More Event Resources, Each Event Resource Providing Access To Events Associated With The Customer's Account, Each Event Resource Being Associated With A Unique Event Resource URL, The Listing Including A First Event Resource That Is Associated With A First Event Resource URL

803

Receive, From The Aggregation Provider Via The First Event Resource URL, A Subscription Request That Requests A Subscription To The First Event Resource, The Subscription Request Specifying A Unique Callback URL And One Or More Types Of Events That The Aggregation Provider Desires To Receive Via The First Event Resource

804

In Response To An Occurrence Of An Event That Matches The One Or More Types Of Events Specified In The Subscription Request, Send, To The Aggregation Provider Via The Callback URL, Event Information Describing The Event

PROVIDING FINANCIAL EVENTS USING A PUSH FRAMEWORK

CROSS-REFERENCE TO RELATED APPLICATIONS

This application claims priority to U.S. Provisional Patent Application No. 62/040,921 filed on Aug. 22, 2014.

BACKGROUND

Financial Aggregation Service Providers harvest financial data from financial institutions on behalf of their joint customers. For example, aggregation providers such as Mint.com, Quicken, and Personal Capital use a variety of methods to fetch financial data from one or more financial institutions on behalf of their customers. Customers oftentimes use these aggregation providers to aggregate financial data from a number of different financial accounts such as from a savings account, a checking account, a credit card account, an investment account, etc. By aggregated a customer's financial data into a single interface, these aggregation providers relieve the customer from having to login to each financial institution's website, download the financial data, and then upload or manually enter that data into a personal finance management application.

Current aggregation providers employ a pull methodology to retrieve a customer's financial data from a financial institution's system. This pull methodology requires the customer to provide his or her login credentials for the financial institution's system to the aggregation provider. With the customer's credentials, the aggregation provider can access the financial institution's system as if it were the customer to obtain the customer's financial data from that financial institution.

This pull methodology raises various issues. Primarily, many financial institutions as well as customers are concerned with providing login credentials to a third party such as the aggregation providers. For example, there is no guarantee that an aggregation provider will store or use these credentials in a secure manner. In view of these security concerns, some financial institutions have implemented measures to prevent aggregation providers from using the customer's login credentials to retrieve the customer's financial data. However, these measures typically upset customers who prefer using the third party aggregation providers to manage their financial data. The current pull methodology also creates an unnecessary load on the financial institution's system since the aggregation providers are constantly logging into the customers' accounts to check for updates which in many instances have not occurred. Accordingly, there is a need for a new methodology that allows aggregation providers to access a customer's financial data without the security concerns that exist with the current pull methodology.

BRIEF SUMMARY

The present invention extends to methods, systems, and computer program products for providing financial events using a push framework. Using the push framework of the present invention, an aggregation provider can subscribe to receive a customer's financial data without ever requiring access to the customer's login credentials. Once an aggregation provider has subscribed to receive a customer's financial data, the financial institution's system can push financial events to the subscribed aggregation provider describing changes that have occurred to the customer's financial data.

To prevent the aggregation provider from having to receive the customer's login credentials, the present invention can employ an authorization protocol, such as the OAuth 2.0 protocol, to allow an aggregation provider to receive an access token from a financial institution which will grant limited access to a customer's account with the financial institution. Once an aggregation provider has received an access token for a customer, the aggregation provider can use the access token to discover which event resources the financial institution provides regarding the customer's account as well as to subscribe to receive events pertaining to the customer's account via these event resources.

A financial institution can provide a URL to which discovery requests can be sent. An aggregation provider can submit discovery requests to this URL and include with the discovery request the customer's access token. In response, the financial institution can respond with a listing of the available event resources. This listing can include, for each event resource, an event resource URL at which the aggregation provider can make subscription requests for a particular type of event.

To subscribe to receive events of a particular type, the aggregation provider can send a subscription request to the event resource URL pertaining to the appropriate event resource. This subscription request can include an indication of one or more particular types of events for which the aggregation provider is subscribing. The subscription request can also include a callback URL which defines where the financial institution should send (i.e., push) events.

Once an aggregation provider has subscribed to receive a particular type of event, any time the particular type of event occurs to or within the customer's account, the financial institution will push an event to the callback URL. In this way, the aggregation provider can receive the event with a single communication without having to repeatedly access the financial institution's system to check for the occurrence of an event thereby greatly reducing the load on the financial institution's system.

To ensure the security and validity of a pushed event, the financial institution and the aggregation provider can implement an event signing process. The event signing process can allow the aggregation provider to ensure that a received event is not a repeat and is not spoofed.

In one embodiment, the present invention is implemented as a method for a financial institution to provide financial events using a push framework. The financial institution receives a discovery request from an aggregation provider. The discovery request includes an access token that identifies a customer that has an account with the financial institution. In response to the discovery request, the financial institution sends a listing of one or more event resources to the aggregation provider. Each event resource provides access to events associated with the customer's account. Each event resource is associated with a unique event resource URL. The listing includes a first event resource that is associated with a first event resource URL. The financial institution receives a subscription request via the first event resource URL from the aggregation provider. The subscription request requests a subscription to the first event resource and specifies a unique callback URL and one or more types of events that the aggregation provider desires to receive via the first event resource. In response to an occurrence of an event that matches the one or more types of events specified in the subscription request, the financial institution sends event information describing the event to the aggregation provider via the callback URL.

In another embodiment, the present invention is implemented as a method for an aggregation provider to subscribe to receive financial events via a push framework. The aggregation provides receives an access token that identifies a customer that has an account with a financial institution. The aggregation provider sends a discovery request that includes the access token to the financial institution. The aggregation provider receives a listing of one or more event resources from the financial institution. Each event resource provides access to events associated with the customer's account. Each event resource is associated with a unique event resource URL. The listing includes a first event resource that is associated with a first event resource URL. The aggregation provider sends a subscription request to the first event resource URL requesting a subscription to the first event resource. The subscription request specifies a unique callback URL and one or more types of events that the aggregation provider desires to receive via the first event resource. The aggregation provider receives event information from the financial institution via the callback URL. The event information describes an event matching the one or more types of events specified in the subscription request.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Embodiments of the present invention may comprise or utilize special purpose or general-purpose computers including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media is categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similarly storage medium which can be used to store desired program code means in the form of computer-executable instructions or data structures and which can be accessed by a general purpose or special purpose computer. Transmission media include signals and carrier waves.

Computer-executable instructions comprise, for example, instructions and data which, when executed by a processor, cause a general purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present invention can be hosted in a cloud environment.

Figure 1:
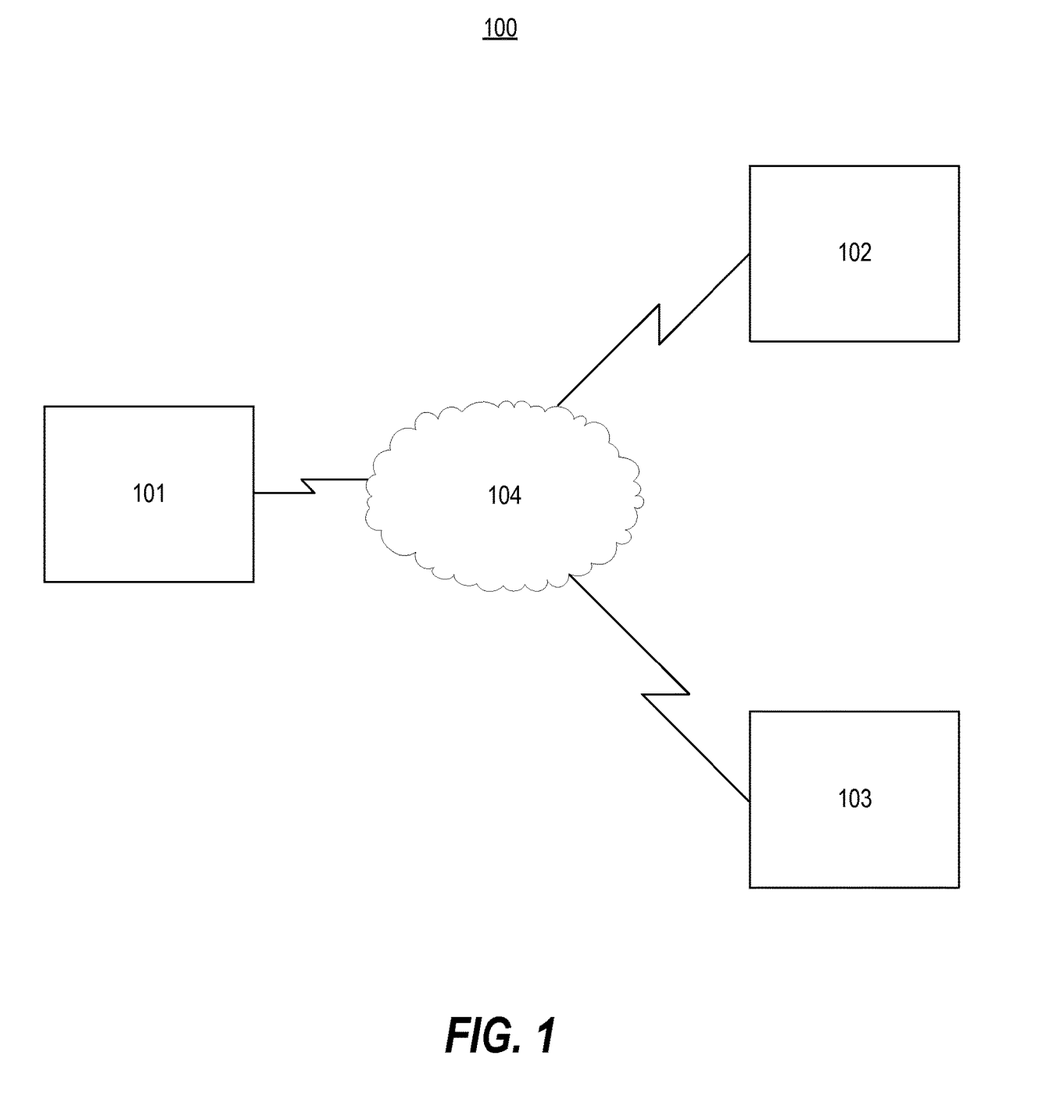
FIG. 1 illustrates an example computing environment in which the present invention can be implemented.

FIG. 1 illustrates an example computer environment 100 in which the present invention can be implemented. Computer environment 100 includes an aggregation provider system 101 (or "aggregation provider"), a financial institution system 102 (or "financial institution"), and a customer system 103 (or "customer") that are interconnected via a network 104.

Each of the depicted systems can represent any number and configuration of computing systems, devices, and/or components. For example, a system, such as aggregation provider system 101 and financial institution system 102, can be a single server computing device or a cloud of server components. A system, such as customer system 103, can represent the many different types of computing devices that can communicate with another system via network 104 including desktop computers, laptop computers, tablets, smart phones, etc. Network 104 can typically be the internet although other network connections, such as local connections, could also be employed.

In accordance with embodiments of the invention, financial institution 102 can employ a push framework to allow an aggregation provider to receive notification of events regarding a customer's financial account when these events occur. The push framework can allow an aggregation provider to receive these events without having to employ the customer's login credentials. The push framework also relieves the aggregation provider from having to repeatedly login to the financial institution to check for updates.

The push framework implements four general processes: (1) an authorization process by which an aggregation provider receives an access token which will allow the aggregation provider to subscribe to receive events pertaining to a particular customer's financial account; (2) a discovery process by which an aggregation provider discovers which event resources a financial institution provides for a particular customer's financial account; (3) a subscription process by which an aggregation provider subscribes to receive events pertaining to a particular customer's account; and (4) an event process by which the financial institution pushes events pertaining to a customer's account to a subscribed aggregation provider.

In this specification, an event resource will refer to the general functionality provided by the financial institution to allow an aggregation provider to receive events. There may be multiple types of event resources which enable subscriptions to receive different types of events. For example, a financial institution may provide an event resource for subscribing to receive account events which describe general changes to a customer's account (e.g., changes to the status of the account such as created, approved, updated, overdrawn, etc.), an event resource for subscribing to receive transaction events which describe individual transactions within an account (e.g., the creation, update, or deletion of a transaction), and an event resource for subscribing to receive profile events which describe changes to the customer's profile associated with the customer's account (e.g., a change to the customer's contact info). The term "events" therefore refers to the changes or other events that occur to or within a customer's account. Many other types of event resources and associated events could also be provided using the push framework of the present invention. Further, although this specification describes the push framework in the context of financial data, the push framework may also employed to enable subscriptions to receive events not pertaining to financial data.

The authorization process of the push framework can be implemented using known authorization techniques such as by implementing the OAuth 2.0 protocol. OAuth 2.0 is a protocol which allows a third party to receive an access token from a service provider that enables the third party to access the service provider to obtain information about or perform some functionality on behalf of a customer. The third party can receive the access token pertaining to a customer without the customer having to provide login credentials for the service provider to the third party.

To receive an access token, the customer is directed to login directly with the service provider and indicate to the service provider that the customer authorizes the third party to access the service provider on the customer's behalf. With the customer's authorization, the service provider then provides an access token to the third party which defines limited rights (or scopes) that the third party has to access the customer's account with the service provider. For example, an access token may have a scope that allows read or read/write access to a customer's profile information, account data, and/or transaction data.

In the context of the present invention, for example, when a customer desires to employ an aggregation provider to aggregate financial data from a financial institution, the aggregation provider can implement the OAuth 2.0 protocol to receive an access token pertaining to the customer from the financial institution. This access token (which may include more than one token such as a refresh token) is used in the subsequent processes of the present invention as described below.

Figure 2:
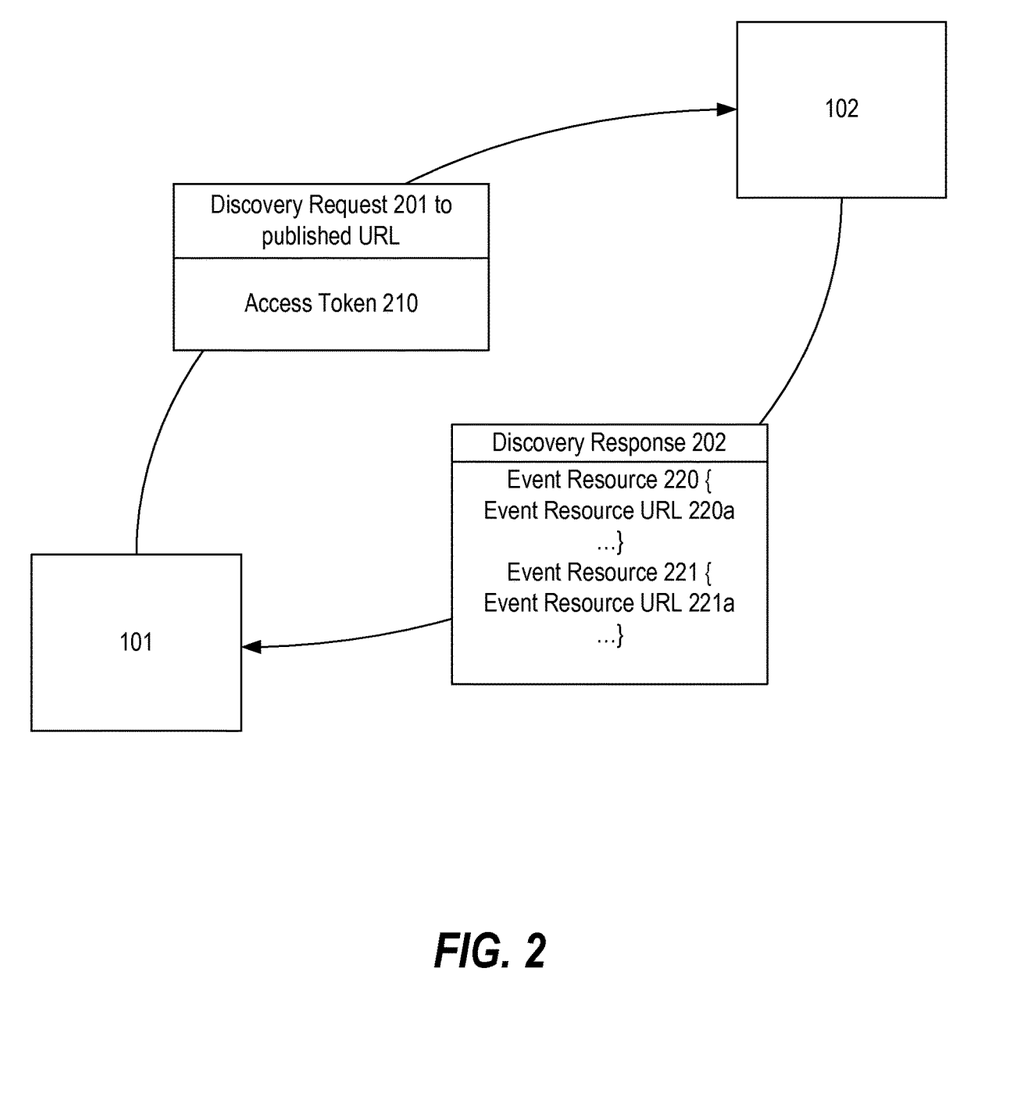
FIG. 2 illustrates a flowchart describing how an aggregation provider can send a discovery request to a financial institution.

FIG. 2 illustrates an example of a discovery process by which an aggregation provider can discover which event resources a financial institution provides for a customer's account. As shown, aggregation provider 101 can send a discovery request 201 to a URL published by the financial institution. In some embodiments, this published URL can comprise the domain name of the financial institution (e.g., bankxyz.com) plus an extension defined for receiving discovery requests (e.g., /txpush/vl/events yielding https://bankxyz.com/txpush/v1/events as the published URL). Discovery request 201 includes access token 210 pertaining to the customer for whom aggregation provider 101 is discovering available event resources.

When financial institution 102 receives discovery request 201, it processes access token 210 to identify the customer associated with access token 210 and whether access token 210 is valid (e.g., not expired). If access token 210 is valid, financial institution 102 returns a discovery response 202 which includes a listing of one or more available event resources for the customer's account. For each event resource included in discovery response 202, financial institution 102 also defines an event resource URL. An event resource URL is the URL to which an aggregation provider sends new subscription requests as will be described below. In FIG. 2, discovery response 202 includes a listing of available event resources that comprises event resource 220 that includes event resource URL 220a and event resource 221 that includes event resource URL 221a. For example, if the financial institution 102 provides account, transaction, and profile event resources for the customer associated with access token 210, discovery response 202 can specify three event resources (one for each of the account, transaction, and profile event resources) each having a unique event resource URL.

Although not shown, an event resource listed in a discovery response will also define one or more events that are made available via the event resource. For example, if the event resource is a transaction event resource, the discovery response may list that the transaction event resource provides events of "created," "updated," "deleted," etc. Similarly, if the event resource is an account event resource, the discovery response may list that the account event resource provides events of "created," "updated," "overdrawn," etc. Also, if the event resource is a profile event resource, the discovery response may list that the profile event resource provides events of "currentState," "updated," etc. Other types of event resources could also be provided in accordance with embodiments of the present invention.

An example of a discovery request can therefore be: HTTP GET https://bankxyz.com/txpush/v1/event { access token}

The body of an example of a corresponding discovery response could therefore be:

```
{
  "account": [
    "url": "https://bankxyz.com/txpush/v1/
      subscriptions/accounts/1
    "events": [
      "currentState",
      "created",
      "updated",
      "overdrawn"
    ],
  ]
  "transaction": [
    ""url": "https://bankxyz.com/txpush/v1/
      subscriptions/transaction/1
    "events": [
      "created",
      "updated",
      "deleted"
    ],
  ]
  "profile": [
    ""url": "https://bankxyz.com/txpush/v1/
      subscriptions/profile/1
    "events": [
      "currentState",
      "deleted"
    ]
  ]
}
```

In this example, the "1" in each URL can represent a unique value assigned to the customer's account such that the URL uniquely identifies the customer's account.

Figure 3:
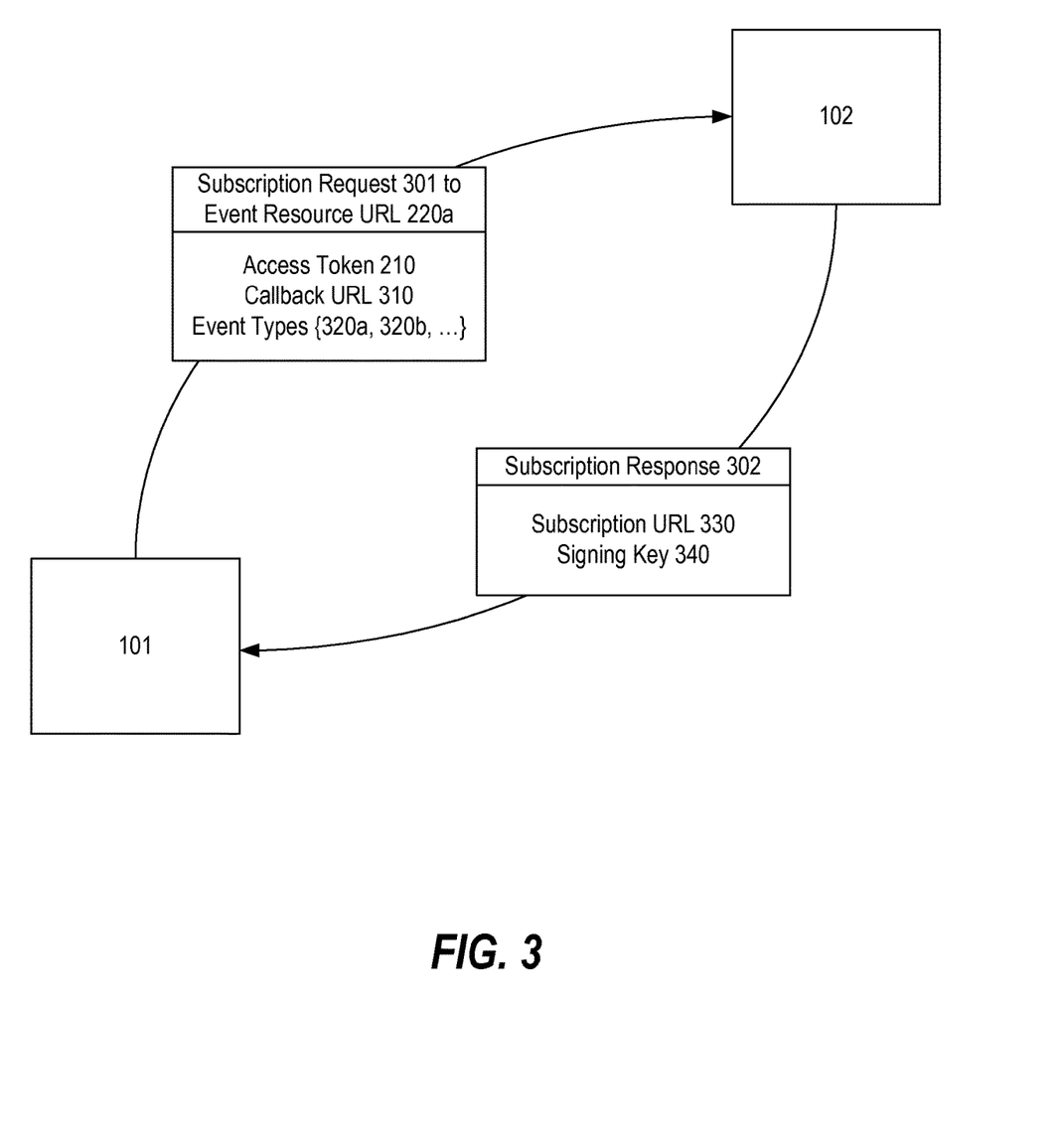
FIG. 3 illustrates a flowchart describing how an aggregation provider can send a subscription request to a financial institution.

Once an aggregation provider has received a discovery response, it can use the information provided in the discovery response to generate and send a subscription request. FIG. 3 illustrates an example of a subscription process by which an aggregation provider can subscribe to receive particular events pertaining to a customer's account.

As shown in FIG. 3, aggregation provider 101 sends subscription request 301 to the event resource URL pertaining to the particular event resource that provides the desired events, which in this example is event resource URL 220a. Using the example discovery response above and assuming subscription request 301 desires to subscribe to events provided by the account event resource, aggregation provider 101 can send subscription request 301 to the event resource URL https://bankxyz.com/txpush/v1/subscriptions/accounts/1.

Accordingly, the event resource URL at which a subscription request is received identifies the event resource for which a subscription is desired. Subscription request 301 also includes access token 210 which, if valid, proves that aggregation provider 101 is authorized to subscribe to the desired events. Subscription request X301 also includes a callback URL 310 and a listing of event types (e.g., 320a and 320b) that aggregation provider 101 would like to receive.

Callback URL 310 comprises the URL to which financial institution 102 will push events once the subscription is established. Callback URL 310 therefore is a unique identifier pertaining to the customer's account. As will be further described below, when an aggregation provider receives an event at a particular callback URL, it can know which customer the event pertains to based on the callback URL where the event was received.

Event types 320a and 320b comprise the particular events that aggregation provider 101 would like to receive. For example, assuming subscription request 301 is sent to the example account event resource URL above, event type 320a could comprise "update" while event type 320b could comprise "overdrawn." In this example, aggregation provider 101 would therefore be subscribing to receive events defining updates to the customer's account and events defining that the account is overdrawn.

When financial institution 102 receives subscription request 301, it can process access token 210 to verify that aggregation provider 101 is authorized to subscribe to events pertaining to the customer's account. If access token 210 is verified, financial institution 102 can send subscription response 302 to aggregation provider 101. Subscription response 302 can include a subscription URL 330 and a signing key 340.

Subscription URL 330 can comprise a unique identifier for the subscription which aggregation provider 101 can use to make any subsequent communications regarding the subscription. For example, if aggregation provider 101 desires to update which events it is subscribed to receive under the subscription, aggregation provider 101 can send a subscription update request to subscription URL 330. Similarly, if aggregation provider 101 desires to delete or refresh the subscription, aggregation provider 101 can send an unsubscribe request or a refresh subscription request to subscription URL 330. The sending of a subscription update request, an unsubscribe request, and a refresh subscription request will be further described below with reference to FIGS. 5-7 respectively.

Signing key 340 can be used by aggregation provider 101 to implement a signing process for verifying received events. This signing process will be further described below.

An example of a subscription request to the example account event resource described above can therefore be:

```
HTTP POST https://bankxyz.com/txpush/v1/subscriptions/
accounts/1 {access token}
{
  "callbackURL": "https://aggregatorxyz.com/webhooks/
    5298737263"
  "eventType": {"updated", "overdrawn"}
}
```

This example request would therefore subscribe to receive "updated" and "overdrawn" events from the account event resource via the callback URL https://aggregatorxyz.com/webhooks/5298737263.

The body of an example of a corresponding subscription response could therefore be:

```
{
"subscriptionURL": https://bankxyz.com/txpush/v1/
subscriptions/subscriptionID123"
"signingKey": "randomSigningKey"
}
```

The "subscriptionID123" in the example subscription URL can represent a unique subscription ID for the subscription. In some embodiments, only the subscription ID, as opposed to the entire subscription URL, can be provided in the subscription response such as when the subscription URL is based on an event resource URL.

Figure 4:
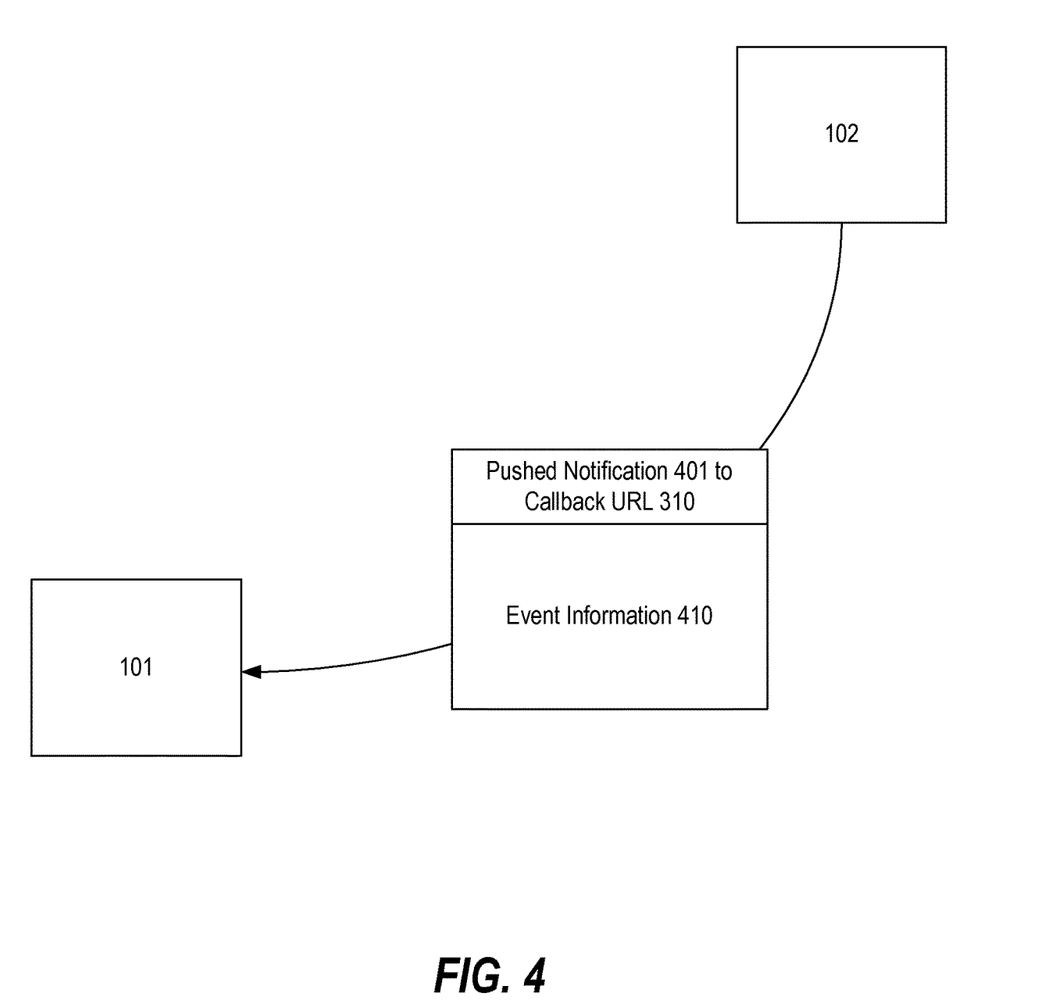
FIG. 4 illustrates a flowchart describing how a financial institution pushes an event to a subscribed aggregation provider.

Once aggregation provider 101 has successfully subscribed to receive one or more events from financial institution 102, financial institution 102 will push the events (or notifications) to aggregation provider 101 using callback URL 310 provided in subscription request 301. FIG. 4 illustrates an example of an event process by which a financial institution can push events to an aggregation provider. As shown, financial institution 102 pushes notification 401 to callback URL 310 which was defined by aggregation provider 101 in subscription request 301 (e.g., to https://aggregatorxyz.com/webhooks/5298737263 if the event is an account event). Notification 401 includes the event information 410 which may be signed using signing key 340.

An example of an account event sent to callback URL https://example.com/webhooks/5298737263 can therefore be:

```
HTTP POST https://example.com/webhooks/5298737263
{
  "number": "59183-24",
  "name": "Universal Savings"
  "url": "https://bankxyz.com/accounts/1",
  "eventType": "updated",
  "balance": "4723.47",
  "type": "savings",
  "institutionUrl": "https://bankxyz.com",
  "status": "active",
  "currency": "USD",
}
```

This example assumes that the account event resource provides an event "updated" and that the aggregation provider has subscribed to receive account events of type "updated" via callback URL https://example.com/webhooks/5298737263.

An example of a transaction event sent to callback URL https://example.com/webhooks/5298710957 can also be:

```
HTTP POST https://aggregatorxyz.com/webhooks/5298710957
{
  "type": "debit",
  "account": "https://bankxyz.com/accounts/1",
  "dateCleared": 1407363941,
  "amount": "6.21"
  "url": "https://bankxyz.com/transactions/3"
  "dateInitiated": 140735000,
  "dateAvailable": 14082000,
  "referenceNumber": "872",
  "standardIndustrialCode": "3720",
  "payee": {
    "name": "John's Aeronautics",
    "extendedName": "John's Aeronautics and Aviation Parts",
    "phoneNumber": "(555) 555 1234"
  },
  "memo": "This was for a throttle body bolt.",
  "images": ["https://bankxyz.com/transactions/3/images/1"],
  "currency": {
    "id": "EUR",
    "rate": "2.1"
  },
  "eventType": "updated",
  "status": "cleared"
}
```

This example also assumes that the transaction event resource provides an event "updated" and that the aggregation provider has subscribed to receive transaction events of type "updated" via callback URL https://example.com/webhooks/5298710957.

As shown in these example events, an event may include many different types of fields for describing the event including an event type which defines the type of event. Virtually any field could be included in an event to provide information about the event. In the case where the event is of type "deleted," the event may not include any fields other than an event type of "deleted."

When sending an event, the financial institution can first sign the event to allow the aggregation provider to verify the authenticity of the event. In some embodiments, this signing process can be implemented as follows. The financial institution can generate a unique identifier such as a universally unique identifier ("UUID") or nonce to be used for signing a particular event. The financial institution includes this nonce as a header in the event HTTP request to be sent to the callback URL that was registered for the event.

Next, the financial institution creates a signing string by concatenating each of the values of the HTTP headers that are included in the event HTTP request in a particular order. In some embodiments, this order can be alphabetical order.

Next, the financial institution encodes the body of the event HTTP request (e.g., using Base64 encoding) and appends the encoded body to the signing string. The signature is then created using the signing string and the signing key provided in the subscription response. In some embodiments, the signature can be created using HMAC SHA256. The generated signature can then be encoded (e.g., using Base64 encoding). The resulting signature is then added to the event HTTP request as a header. The event HTTP request can then be sent to the aggregation provider.

When the aggregation provider receives the event HTTP request, it can employ a similar process to verify the signature. First, the aggregation provider can extract the nonce from the HTTP header and verify that the nonce has not previously been used. If the nonce has been previously used, the event can be ignored. The aggregation provider can then generate a signing string in a similar manner as the financial institution by concatenating the headers of the event HTTP request in the same order used by the financial institution (e.g., alphabetical order). When concatenating the headers into the signing string, the aggregation provider will not include the signature. The aggregation provider then encodes the body of the event HTTP request, appends the encoded body to the signing string, and creates the signature using the signing string and the signing key in the same manner as the financial institution created the signature. If the signature generated by the aggregation provider matches the signature included in the event HTTP request, the event is valid and can be processed by the aggregation provider.

Figure 5:
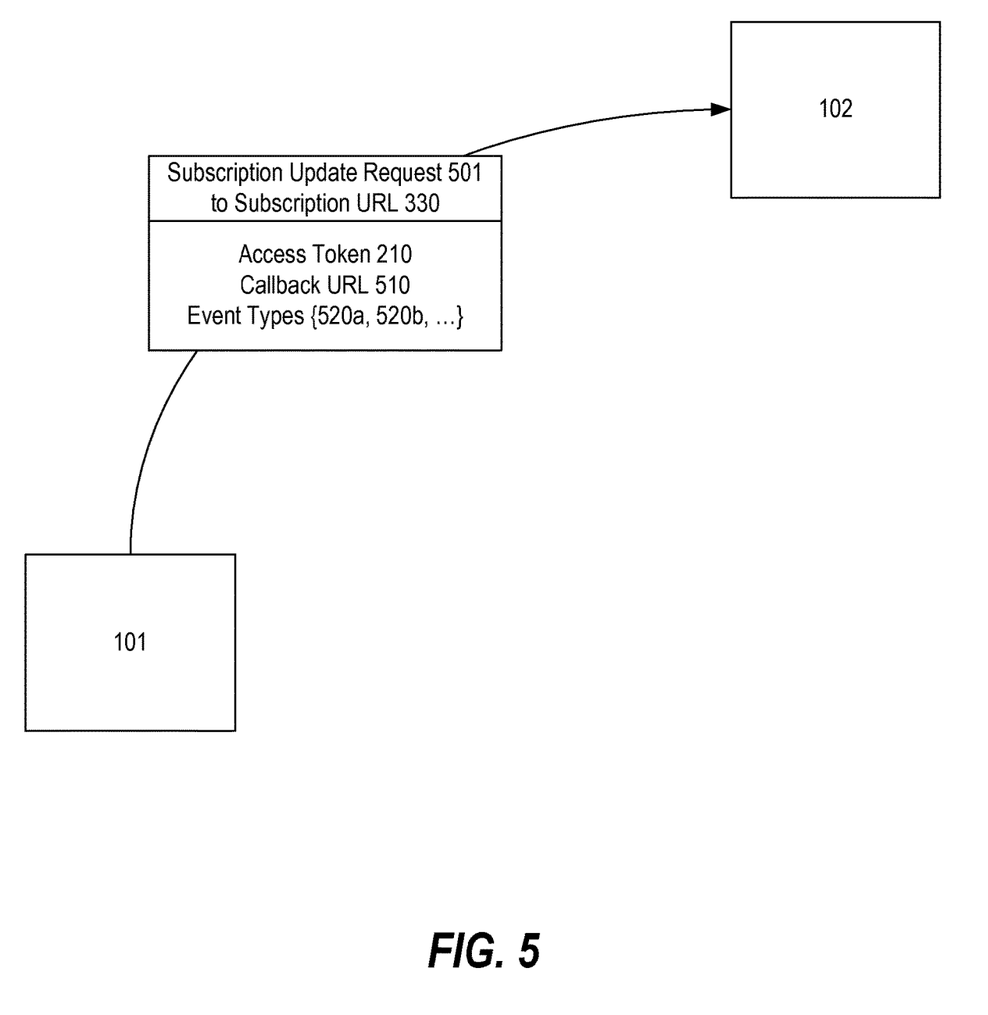
FIG. 5 illustrates a flowchart describing how an aggregation provider can send a subscription update request to a financial institution.

FIG. 5 illustrates an example of a subscription update process that an aggregation provider can employ to update an event subscription. As shown, aggregation provider 101 can send subscription update request 501 to subscription URL 330 which financial institution 102 specified in subscription response 302. Subscription update request 501 can include access token 210 which will serve as proof that aggregation provider 101 is authorized to update the subscription. Subscription update request 501 also includes one or more items to be updated such as a new callback URL 510 or one or more event types 520a, 520b that aggregation provider 101 desires to receives.

In response, financial institution 102 can update the subscription by replacing callback URL 310 with callback URL 510 such that future events associated with the subscription are pushed to callback URL 510. Similarly, financial institution 102 can add event types 520a, 520b to the subscription (whether by adding the event types to existing event types or replacing the existing event types) such that when events of type 520a, 520b occur, these events will be pushed to aggregation provider 101. Although subscription update request 501 includes both a new callback URL and new event types, both types of updates are not required to be specified in the request. In some embodiments, the event types listed in a subscription update request can replace (rather than being added to) the existing event types in the subscription as mentioned above. In such embodiments, the subscription update request would specify all the event types that the aggregation provider would like to receive even if some of the event types were already included in the subscription. Although not shown, financial institution 102 may respond to subscription update request 501 by sending a confirmation that the updates were successfully made.

Figure 6:
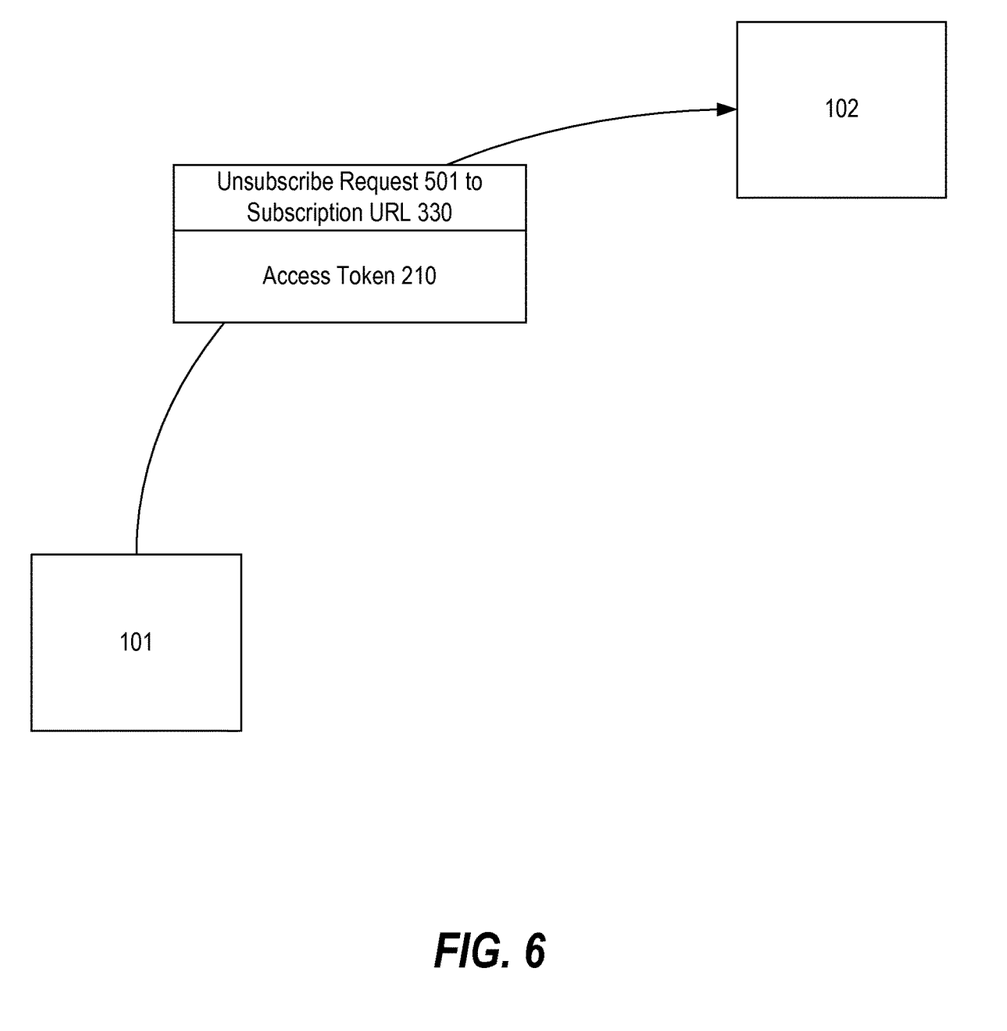
FIG. 6 illustrates a flowchart describing how an aggregation provider can send an unsubscribe request to a financial institution.

FIG. 6 illustrates an example of an unsubscribe process that aggregation provider can employ to unsubscribe from receiving events from an event resource. As shown, aggregation provider 101 sends unsubscribe request 601 to subscription URL 330. Unsubscribe request 601 includes access token 210 as proof that aggregation provider 101 is authorized to unsubscribe. In response, financial institution 102 can unsubscribe aggregation provider 101 from the subscription defined by subscription URL 330 such that aggregation provider 101 no longer receives events for the subscription. Although not shown, financial institution 102 may respond to unsubscribe request 601 by sending a confirmation that the subscription was successfully canceled.

Figure 7:
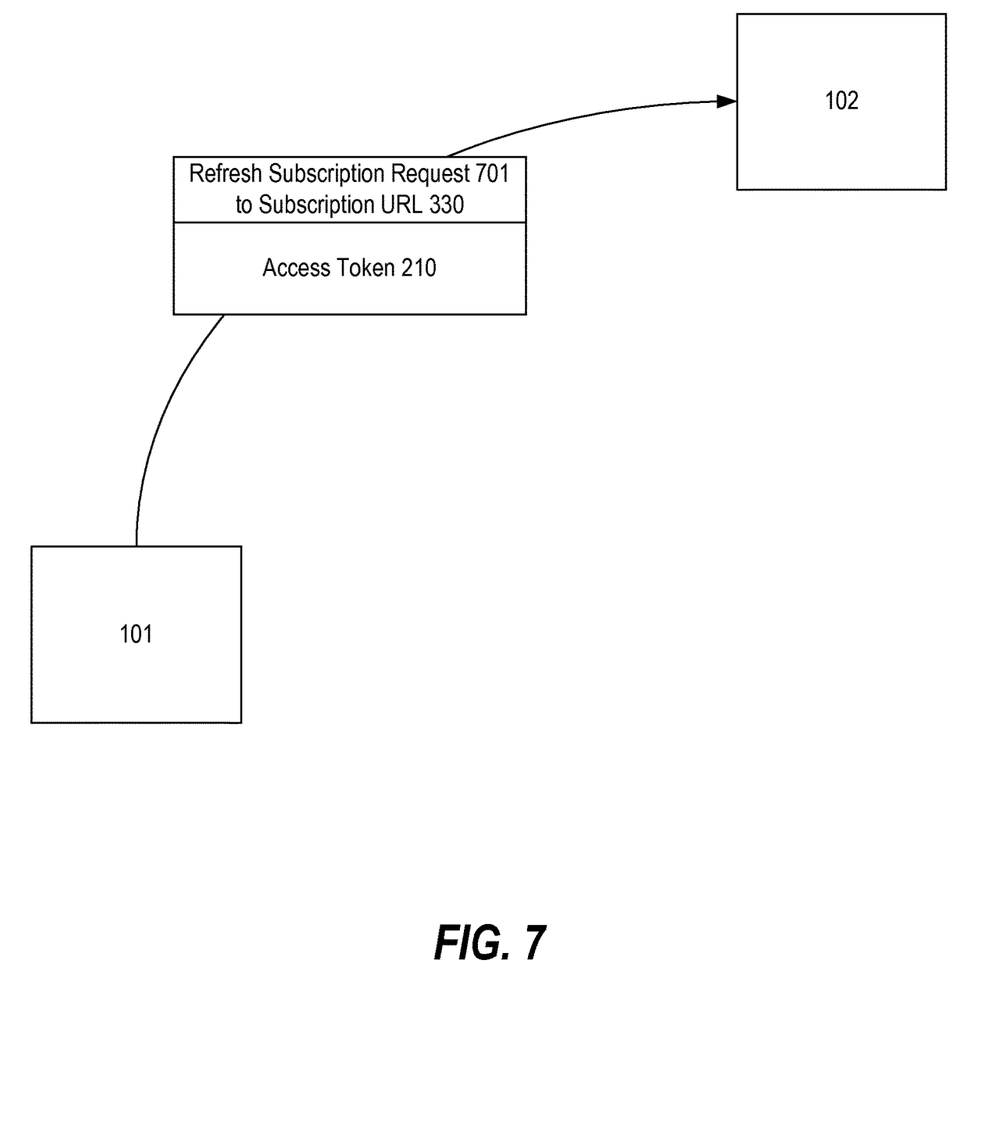
FIG. 7 illustrates a flowchart describing how an aggregation provider can send a refresh subscription request to a financial institution.

FIG. 7 illustrates an example of a subscription refresh process that aggregation provider can employ to refresh a subscription with financial institution 102. In some embodiments, a financial institution can require an aggregation provider to refresh a subscription periodically such as every seven days. As shown, aggregation provider 101 sends refresh subscription request 701 to subscription URL 330. Refresh subscription request 701 includes access token 210 (or possibly a refresh token) as proof that aggregation provider 101 is authorized to refresh the subscription. Although not shown, financial institution 102 may respond to refresh subscription request 701 by sending a confirmation that the subscription was successfully refreshed.

Figure 8:
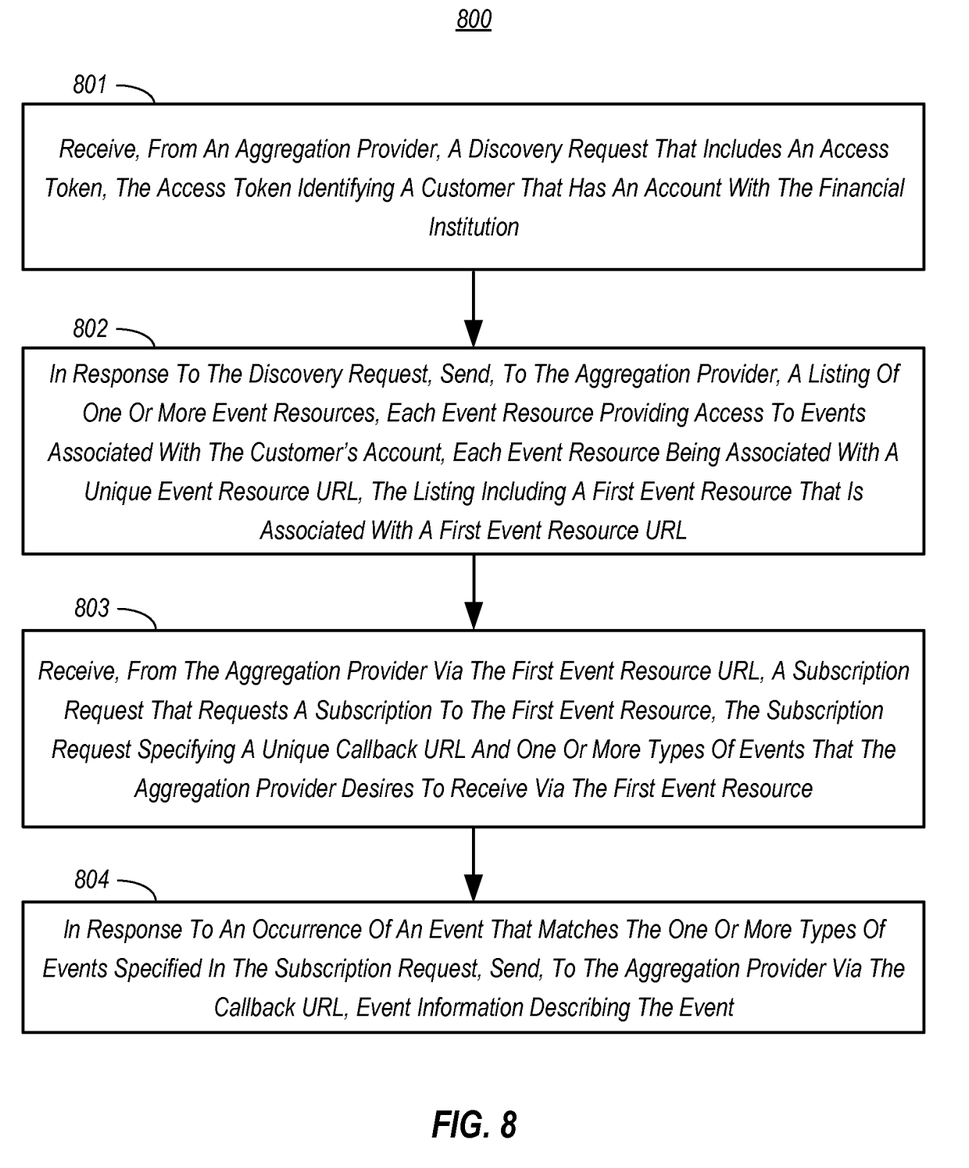
FIG. 8 illustrates a flowchart of an example method for providing financial events using a push framework.

FIG. 8 illustrates a flowchart of an example method 800 for providing financial events using a push framework. Method 800 will be described with reference to FIGS. 2-4.

Method 800 includes an act 801 of receiving, from an aggregation provider, a discovery request that includes an access token. The access token identifies a customer that has an account with the financial institution. For example, financial institution 102 can receive discovery request 201 that includes access token 210 from aggregation provider 101.

Method 800 includes an act 802 of, in response to the discovery request, sending, to the aggregation provider, a listing of one or more event resources. Each event resource provides access to events associated with the customer's account. Each event resource is associated with a unique event resource URL. The listing includes a first event resource that is associated with a first event resource URL. For example, financial institution 102 can send discovery response 202 which includes event resources 220, 221 with associated event resource URLs 220a, 221a to aggregation provider 101.

Method 800 includes an act 803 of receiving, from the aggregation provider via the first event resource URL, a subscription request that requests a subscription to the first event resource. The subscription request specifies a unique callback URL and one or more types of events that the aggregation provider desires to receive via the first event resource. For example, financial institution 102 can receive subscription request 301 from aggregation provider 101 via event resource URL 220a. Subscription request 301 can specify callback URL 310 and event types 320a, 320b.

Method 800 includes an act 804 of, in response to an occurrence of an event that matches the one or more types of events specified in the subscription request, sending, to the aggregation provider via the callback URL, event information describing the event. For example, financial institution 102 can push notification 401, which includes event information 410, to callback URL 310.

Figure 9:
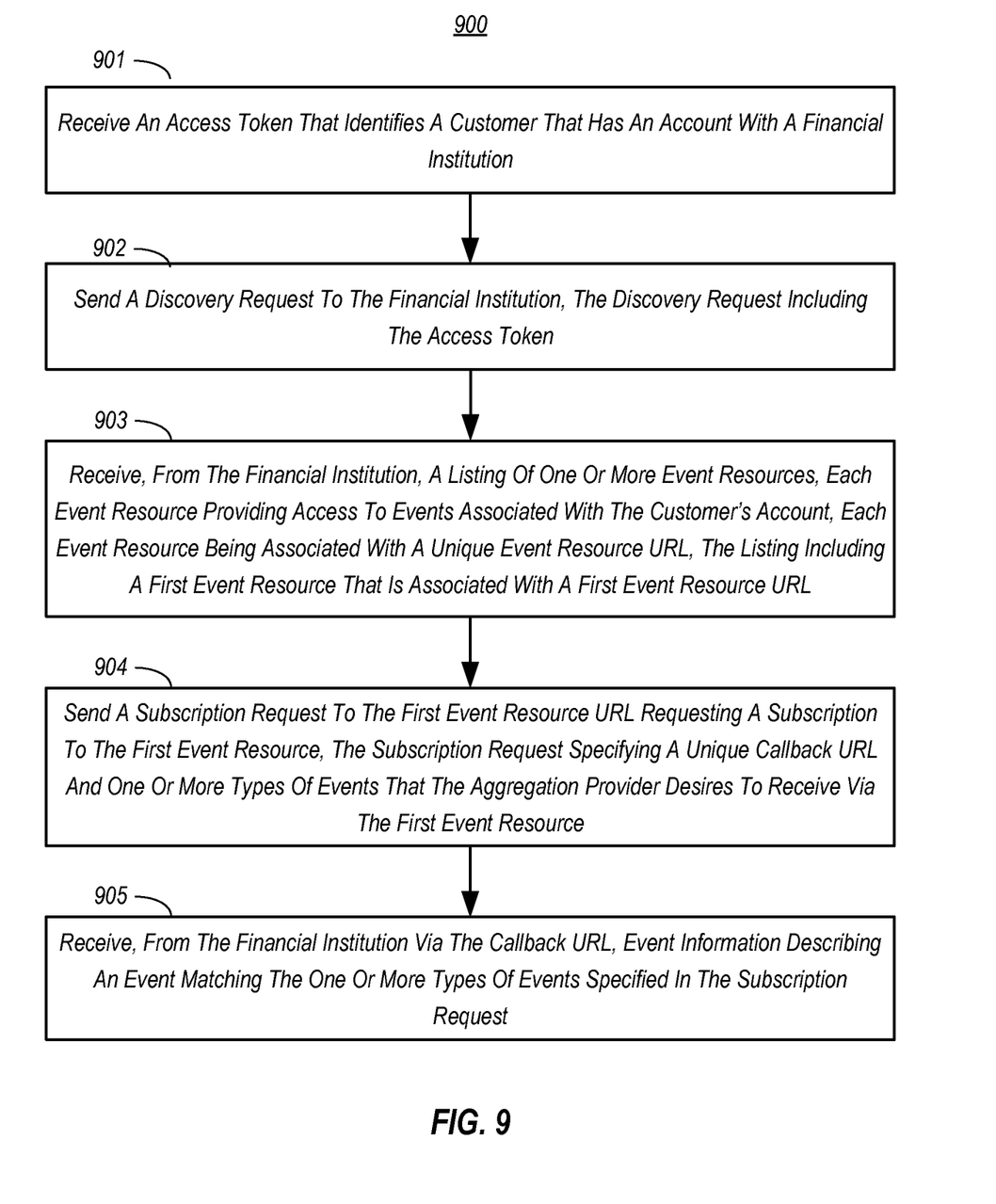
FIG. 9 illustrates a flowchart of an example method for subscribing to receive financial events via a push framework.

FIG. 9 illustrates a flowchart of an example method 900 for subscribing to receive financial events via a push framework. Method 900 will be described with reference to FIGS. 2-4.

Method 900 includes an act 901 of receiving an access token that identifies a customer that has an account with a financial institution. For example, aggregation provider 101 can receive access token 210.

Method 900 includes an act 902 of sending a discovery request to the financial institution. The discovery request includes the access token. For example, aggregation provider 101 can send discovery request 201 which includes access token 210 to financial institution 102.

Method 900 includes an act 903 of receiving, from the financial institution, a listing of one or more event resources. Each event resource provides access to events associated with the customer's account. Each event resource is associated with a unique event resource URL. The listing includes a first event resource that is associated with a first event resource URL. For example, aggregation provider 101 can receive discovery response 202 from financial institution 102. Discovery response 202 lists event resources 220, 221 with the associated event resource URLs 220a, 221a.

Method 900 includes an act 904 of sending a subscription request to the first event resource URL requesting a subscription to the first event resource. The subscription request specifies a unique callback URL and one or more types of events that the aggregation provider desires to receive via the first event resource. For example, aggregation provider 101 can send subscription request 301 to financial institution 102 via event resource 220a. Subscription request 301 specifies callback URL 310 and event types 320a, 320b.

Method 900 includes an act 905 of receiving, from the financial institution via the callback URL, event information describing an event matching the one or more types of events specified in the subscription request. For example, aggregation provider 101 can receive notification 401 via callback URL 310 which includes event information 410.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A method, implemented by a financial institution, for providing financial events using a push framework, the method comprising:
   receiving, from an aggregation provider, a discovery request that includes an access token, the access token identifying a customer that has an account with the financial institution;
   determining that the access token is valid;
   in response to the discovery request and validation of the access token, sending, to the aggregation provider, a listing of one or more event resources, each event resource providing access to events associated with the customer's account, each event resource being associated with a unique event resource Uniform Resource Locator (URL), the listing including a first event resource that is associated with a first event resource URL;

receiving, from the aggregation provider via the first event resource URL, a subscription request that includes the access token and that requests a subscription to the first event resource, the subscription request specifying a unique callback URL and one or more types of events that the aggregation provider desires to receive via the first event resource;

in response to the subscription request, verifying that the aggregation provider is authorized to subscribe to the one or more types of events based on the access token;

sending, to the aggregation provider, a subscription response that includes a signing key to be used in verifying event information received at the callback URL; and in response to an occurrence of an event that matches the one or more types of events specified in the subscription request, sending, to the aggregation provider via the callback URL, an event HyperText Transfer Protocol (HTTP) request including event information describing the event, wherein the event information is signed by the financial institution and includes a signature generated using the signing key and a signing string created from one or more values of a header of the event HTTP request, wherein the aggregation provider generates a second signature for the event HTTP request using the signing key, wherein the aggregation provider compares the second signature to the signature included with the event HTTP request to verify the event information based on a match.

2. The method of claim 1, wherein the account is one of a checking, savings, credit card, or investment account.

3. The method of claim 1, wherein the first event resource provides access to one of account events, transaction events, or profile events.

4. The method of claim 1, wherein the first event resource provides access to account events, and the one or more types of events include one or more of a current state event that defines a current state of the account, a created event that defines the creation of the account, an updated event that defines an update to the account, or an overdrawn event that defines that the account is overdrawn.

5. The method of claim 1, wherein the first event resource provides access to transaction events, and the one or more types of events includes one or more of a created event that defines that a transaction was created within the account, an updated event that defines that a transaction was updated within the account, or a deleted event that defines that a transaction was deleted within the account.

6. The method of claim 1, wherein the first event resource provides access to profile events, and the one or more types of events include one or more of a current state event that defines a current state of a profile associated with the account or an updated event that defines an update to the profile associated with the account.

7. The method of claim 1, wherein the one or more types of events comprise a subset of all types of events that are accessible via the first event resource.

8. The method of claim 1, wherein the subscription response includes a subscription URL that is uniquely associated with the subscription.

9. The method of claim 8, further comprising:
receiving, from the aggregation provider via the subscription URL, a subscription update request that includes the access token and one or more updates to be made to the subscription.

10. The method of claim 9, wherein the one or more updates includes one or more of a different callback URL to which future event information describing events is to be sent, or one or more types of events that the aggregation provider desires to receive via the first event resource.

11. The method of claim 8, further comprising:
receiving, from the aggregation provider via the subscription URL, an unsubscribe request; and
unsubscribing the aggregation provider from the first event resource.

12. The method of claim 8, further comprising:
receiving, from the aggregation provider via the subscription URL, a refresh subscription request; and
refreshing the aggregation's provider subscription to the first event resource.

13. A method, performed by an aggregation provider, for subscribing to receive financial events via a push framework, the method comprising:
receiving an access token that identifies a customer that has an account with a financial institution;
sending a discovery request to the financial institution, the discovery request including the access token;
receiving, from the financial institution, a listing of one or more event resources, each event resource providing access to events associated with the customer's account, each event resource being associated with a unique event resource Uniform Resource Locator (URL), the listing including a first event resource that is associated with a first event resource URL;
sending a subscription request to the first event resource URL requesting a subscription to the first event resource, the subscription request including the access token, the subscription request specifying a unique callback URL and one or more types of events that the aggregation provider desires to receive via the first event resource;
in response to the subscription request, receiving a subscription response that includes a signing key to be used in verifying event information received at the callback URL;
in response to the subscription request, upon an occurrence of an event that matches the one or more types of events specified in the subscription request, receiving, via the callback URL, an event HyperText Transfer Protocol (HTTP) request including event information describing the event, wherein the event information is signed by the financial institution and includes a signature generated using the signing key and a signing string created from one or more values of a header of the event HTTP request,
upon receipt of the event HTTP request, generating a second signature for the event HTTP request using the signing key; and
matching the second signature to the signature included with the event HTTP request to verify the event information.

14. The method of claim 13, wherein the subscription response includes a subscription URL.

15. The method of claim 14, further comprising:
sending one of a subscription update request, an unsubscribe request, or a refresh subscription request to the financial institution via the subscription URL.

16. The method of claim 15, wherein the subscription update request specifies one or more of a different callback URL or one or more types of events that the aggregation provider desires to receive via the first event resource.

17. The method of claim 13, wherein the event information defines the type of the event.

\* \* \* \* \*